United States Patent [19]

Poyer

[11] Patent Number: 4,964,286
[45] Date of Patent: Oct. 23, 1990

[54] SECURITY DEVICE FOR A VIDEO RECORDER OR PLAYER

[76] Inventor: Michael Poyer, 42 Golden Grove, Swansea, United Kingdom

[21] Appl. No.: 381,667
[22] PCT Filed: Dec. 12, 1988
[86] PCT No.: PCT/GB88/01084
§ 371 Date: Jun. 30, 1989
§ 102(e) Date: Jun. 30, 1989
[87] PCT Pub. No.: WO89/05510
PCT Pub. Date: Jun. 15, 1989

[30] Foreign Application Priority Data

Dec. 10, 1987 [GB] United Kingdom ............. 8728838
Oct. 3, 1988 [GB] United Kingdom ............. 8823134

[51] Int. Cl.[5] ............................................. E05B 73/00
[52] U.S. Cl. ..................................... 70/58; 70/14
[58] Field of Search ............... 70/14, 58, 57; 206/387

[56] References Cited

U.S. PATENT DOCUMENTS

| | | | |
|---|---|---|---|
| 4,131,001 | 12/1978 | Gotto | 70/14 |
| 4,527,405 | 7/1985 | Renick et al. | 70/14 |
| 4,616,490 | 10/1986 | Robbins | 70/14 |
| 4,640,106 | 2/1987 | Derman | 70/14 |
| 4,655,057 | 4/1987 | Derman | 70/14 |
| 4,656,551 | 4/1987 | Gotto | 70/14 |

FOREIGN PATENT DOCUMENTS

| | | |
|---|---|---|
| 0118200 | 9/1984 | European Pat. Off. . |
| WO 85/5925 | 12/1985 | European Pat. Off. . |
| 0169353 | 1/1986 | European Pat. Off. . |
| WO 86/4180 | 7/1986 | European Pat. Off. . |
| 8511542 | 7/1985 | Fed. Rep. of Germany . |
| 8510377 | 12/1985 | Fed. Rep. of Germany . |
| WO 83/02846 | 8/1983 | PCT Int'l Appl. . |
| WO 86/04180 | 7/1986 | PCT Int'l Appl. . |
| 2131219B | 6/1984 | United Kingdom . |

*Primary Examiner*—Robert L. Wolfe

[57] ABSTRACT

A security device for a video recorder or player is adapted for insertion into the cassette-receiving opening and for locking therein.

The device has a body (1) housing a locking mechanism (6) which cooperates with opposed locking members (4a, 4b) which are movable between retracted positions and the illustrated extended positions in which the members can frictionally engage the respective internal side walls of the opening to retain the device. The dimensions of the body are substantially the same as a standard video cassette except that the depth c is smaller; this and the fact that the device has a peripheral flange (2) adapted to engage the periphery of the opening thereby covering the opening and preventing the device from being inserted too far into the opening, prevent actuation of the cassette-receiving mechanism when the device is inserted in the cassette-receiving opening.

8 Claims, 4 Drawing Sheets

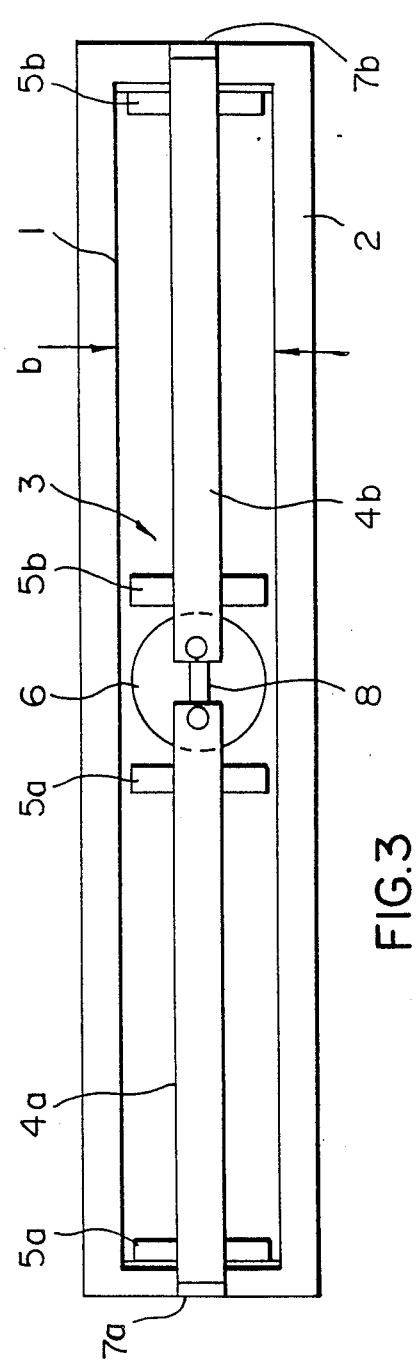
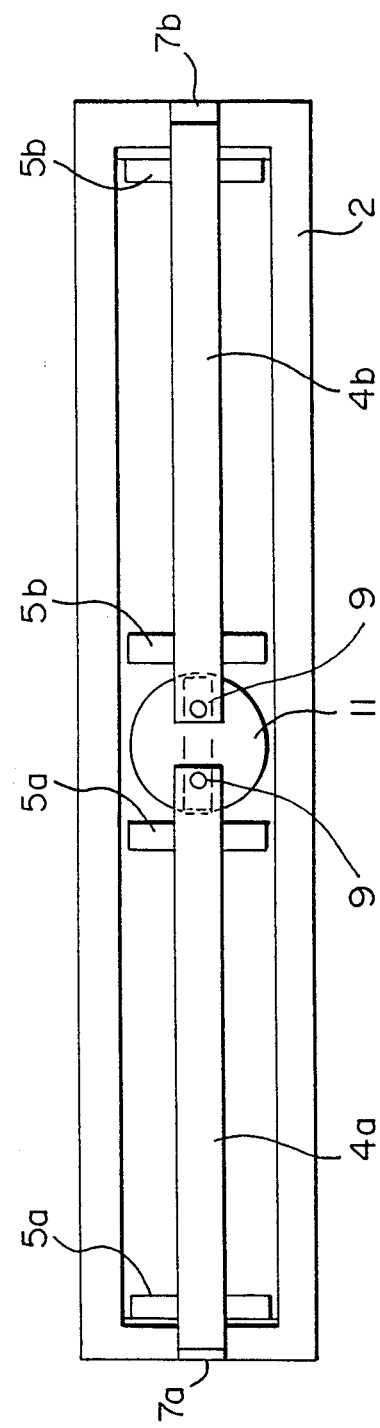
FIG.3
FIG. 4

SECURITY DEVICE FOR A VIDEO RECORDER OR PLAYER

The present invention relates to a security device for a video cassette player or recorder.

A video recorder or player normally has a cassette-receiving opening which is closed by a hinged flap which permits insertion of the cassette but which, when closed, serves to keep out dust. However, it is possible for a screwdriver or other foreign body to be inserted through the opening, causing damage to the player or recorder and possible injury to the person responsible. Furthermore, it is possible for unsupervised minors to play video tapes unsuitable for their particular age group.

In order to prevent access to the cassette-receiving opening it has previously been proposed to block the opening using a dummy cassette of substantially the same size and configuration, including holes for receiving drive spindles, as a standard video cassette. Such dummy cassettes have locking arrangements which secure the cassette to the recorder or player.

Previously proposed dummy cassettes generally have the disadvantages that they can activate the tape-receiving mechanism of the recorder, as would a standard cassette, and that they have complex locking mechanisms. Such mechanisms may require careful alignment of the dummy cassette with the walls of the recorder opening to enable latching of the cassette, for example, to holes in the walls of the opening or to the drive spindles of the recorder.

The present invention aims to provide a security device which is effective and simple to use and which does not act as a dummy cassette.

In accordance with the present invention, there is provided a security device for a video cassette player or recorder having a cassette-receiving opening and a cassette-receiving mechanism within said opening, the device comprising a body which is insertable in the opening, wherein the body houses a locking a mechanism co-operating with opposed locking members extending longitudinally of the body and movable between retracted positions and extended, locking positions in which the locking members can frictionally engage the internal sides walls of the opening to retain the body therein, the length and breadth of the body being substantially the same as the corresponding dimensions of a video cassette, but the depth of the body being smaller than that of the video cassette, the body being provided with a peripheral flange for engaging the body adjacent said opening, so as to prevent insertion of said body to a depth which would cause activation of the cassette-receiving mechanism.

Preferably, each locking member has an end surface of resilient material, such as rubber or plastics. Each end surface may be so shaped that its grip on the side wall increases if an attempt is made to pull the device from the opening when in its locked condition. The locking members may, for example, have wedge-shaped or stepped caps such that the lateral dimension of each locking member increases with depth of insertion of the device.

The peripheral flange may extend part or all of the way around the device. In a preferred embodiment of the invention, the flange preferably comprises a front plate which, when the device is inserted in the opening, engages the periphery of the opening to thereby completely close it and to prevent the device being pushed too far into the opening.

Some forms of security device in accordance with the invention for a video cassette player or recorder will now be described, by way of example, with reference to the accompanying drawings in which:

FIGS. 1 to 3 are respectively front, top plan and rear views of one form of the device;

FIG. 4 is a rear view of another form of the device;

Figure 1:
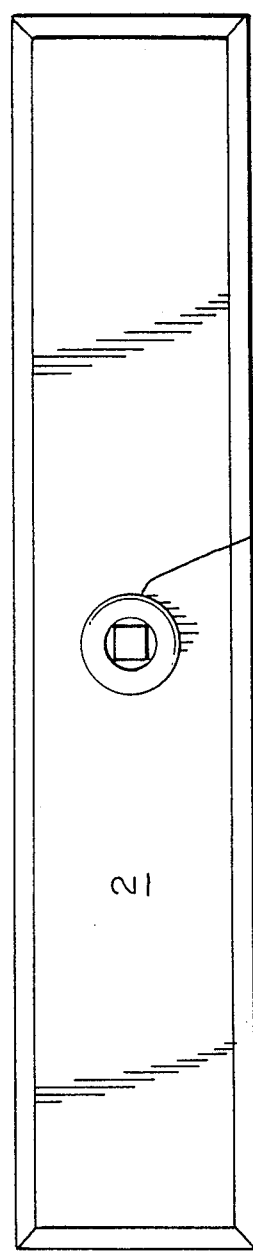
Figure 2:
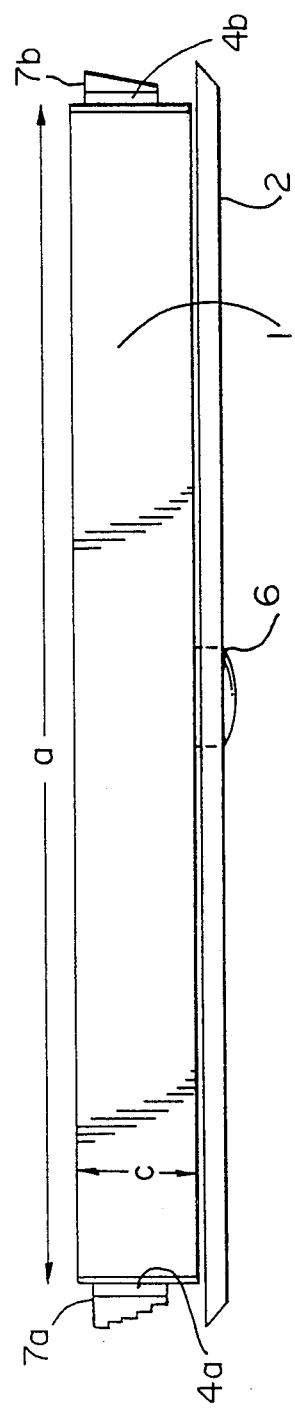

Referring to FIGS. 1 to 3, the security device comprises a hollow body or casing 1, the length a and breadth b of which are substantially the same as those of a standard video cassette to enable insertion of the device into a cassette-receiving opening of a video cassette player or recorder (not shown). The depth c of the body has a dimension substantially less than that of a cassette, say of the order of 20 to 45 mm, so that when the body is inserted into the cassette-receiving opening of a cassette player or recorder, the tape-receiving mechanism of the latter is not actuated.

Secured to the front of the body 1 is a fascia plate 2 which completely covers the cassette-receiving opening when the device is inserted therein and prevents insertion of the body too far into the opening.

Located within the body is a retaining or locking mechanism 3 which comprises two opposed longitudinally slidable locking members 4a, 4b supported by respective guides 5a, 5b. At its inner end, each member 4a, 4b co-operates with a locking mechanism 6 that is openable to enable the members, 4a, 46 to move from a retracted position (not shown) in which the members are substantially wholly contained within the body 1 to the illustrated extended position in which the members extend outside the body so as to engage the respective side walls of the cassette-receiving opening, thereby preventing removal of the device from the opening.

In order to enhance the grip of the members on the respective side walls, each member 4a, 4b has at its free end a resilient cap 7a, 7b. Preferably, the end cap 7a, 7b is so shaped that its lateral dimension increases with depth of insertion in the opening, such that its grip on the opening side wall is increased should an attempt be made to prise the device out of the opening. For example, the end cap may be wedge-shaped (as illustrated for cap 7b) or stepped (as illustrated for cap 7a).

The locking mechanism 6 of device of FIGS. 1 to 3 comprises a rotatable cam 8 engageable with the ends of the members 4a, 4b, rotation of the cam 8, by operation of a suitable key, effecting longitudinal movement of the members 4a, 4b between their retracted and locking positions. The locking members may be spring loaded to their retracted positions and urged outwardly by the cam 8 or spring loaded to their extended positions in which case they are attached to the cam which can pull the members inwardly towards each other.

Figure 5:
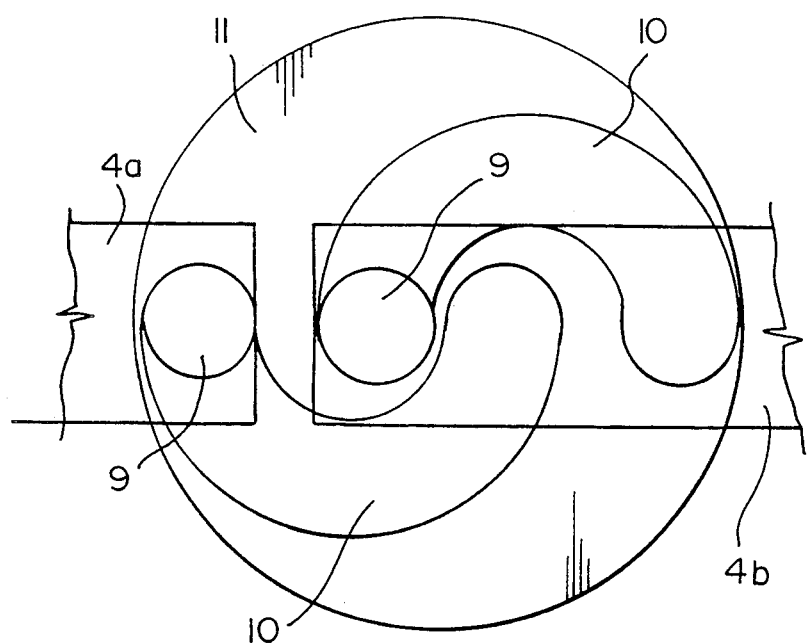
FIG. 5 is an enlarged schematic detail view of a locking mechanism of the device of FIG. 4.

An alternative form of locking mechanism 6 is illustrated in FIGS. 4 and 5. In this form of mechanism the inner end of each member 4a, 4b has a spigot 9 which engages in a cam slot 10 in a rotatable disc 11 of the mechanism 6. In FIG. 5, the left hand member 4a is shown in the locked position and the right hand member 4b in the unlocked, retracted position. As will be seen, rotation of the disc 11 effects longitudinal movement of the locking members.

Figure 6:
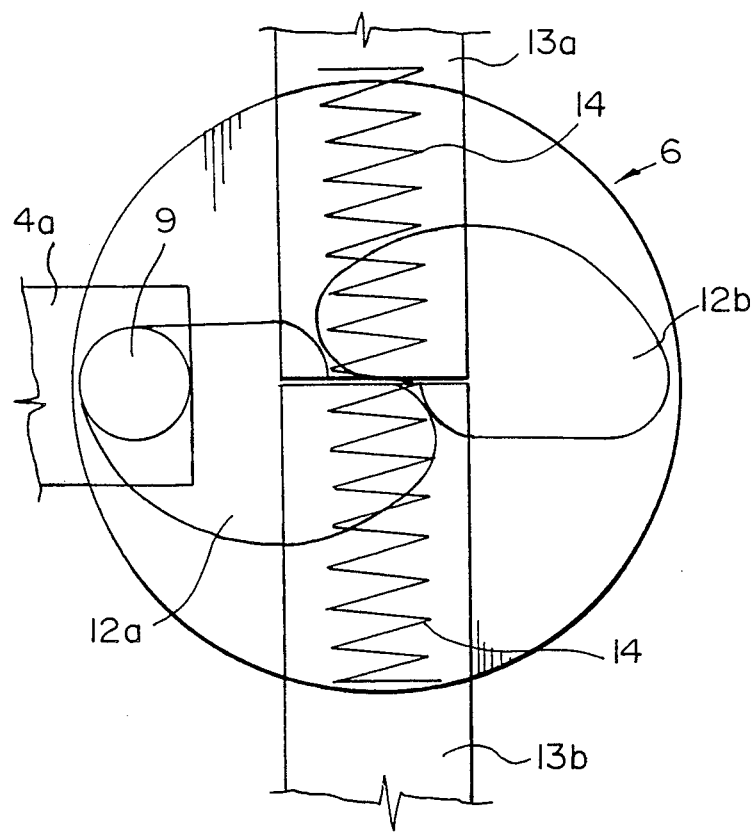
FIG. 6 is a view similar to that of FIG. 5 of a different locking mechanism.

FIG. 6 is a detail view similar to that of FIG. 5, but with the spigots 9 of the members engaging in respective cams 12a, 12b which co-operate with respective spring-loaded actuating members 13a, 13b. The arrangement is such that the springs 14 urge the cams to the locked position shown by cam 12a and the cams can be rotated to the unlocked position shown by cam 12b.

Other forms of locking mechanism may, of course, be used. For example, the lock may be a combination lock.

The above-described security device has the advantage that it is simple to use and when inserted in the cassette-receiving opening of a video recorder or player, use of the latter is prevented. Also, the device requires no modification of the recorder or player and causes no damage when locked in the opening, the caps 7a, 7b being preferably of rubber or plastics material. The device can be such that it will fit the cassette-receiving opening of any standard recorder or player but will not, of course, activate the cassette-receiving mechanism in the opening.

I claim:

1. A security device for a video cassette player or recorder comprising a casing having a cassette-receiving opening and a cassette-receiving mechanism within said opening, said device comprising:
   (a) a body which is insertable in said opening, the length and breadth of said body being substantially the same as the corresponding dimensions of a standard video cassette, but the depth of said body being smaller than that of said video cassette such that a functional video cassette may remain in said player when said security device is fitted thereon.
   (b) a locking mechanism housed in said body, said locking mechanism including opposed locking members extending longitudinally of the body, said locking members each being movable between respective retracted positions in which said locking members are contained substantially wholly within the length, breadth and depth of said body, and locking positions in which end portions of said locking members extend beyond the longitudinal ends of said body, in which locking positions end surfaces provided on said end portions are arranged to frictionally engage the internal side walls of said opening to retain the body in said opening, at least one of said end surfaces having a stepped profile which is so shaped as to in use increase its grip on the respective side wall while said locking members are in said locking positions; and
   (c) a peripheral flange provided on said body for engaging said casing around the periphery of said opening, so as to prevent insertion of said body to a depth which would cause activation of said cassette-receiving mechanism.

2. A security device for a video cassette player or recorder comprising a casing having a cassette-receiving opening and a cassette-receiving machanism within said opening, said device comprising
   (a) a body which is insertable in said opening, the length and breadth of said body being substantially the same as the corresponding dimensions of a standard video cassette, but the depth of said body being smaller than that of said video cassette;
   (b) a locking mechanism housed in said body, said locking mechanism including opposed locking members extending longitudinally of the body, said locking members each being movable between respective retracted positions in which said locking members are contained substantially wholly within the length, breadth and depth of said body, and locking positions in which said locking members extend beyond the longitudinal ends of said body, at least one of said locking members being provided with substantially stepped profile arranged such that when said one locking member is in its respective locking position said profile abuts corresponding substantially mutually perpendicular surfaces provided on the interior of said cassette player, such that said body will be positively retained within said opening; and
   (c) a peripheral flange provided on said body for engaging said casing around the periphery of said opening, so as to prevent insertion of said body to a depth which would cause activation of said cassette-receiving mechanism.

3. A security device according to claim 2, wherein said peripheral flange comprises an end plate which extends beyond the periphery of the body and is arranged to completely cover said opening.

4. A security device according to claim 3, wherein said stepped profile is so arranged as to in use increase the grip on the associated side wall of said opening while said locking members are in said locked positions.

5. A security device according to claim 3, wherein said locking members are spring loaded to their locked positions and are releasable to their retracted positions by said locking mechanism.

6. A security device according to claim 4, wherein said locking members are spring loaded to their locked positions and are releasable to their retracted positions by said locking mechanism.

7. A security device for a video cassette player or recorder comprising a casing having a cassette-receiving opening and a cassette-receiving mechanism within said opening, said device comprising
   (a) a body which is insertable in said opening, the length and breadth of said body being substantially the same as the corresponding dimensions of a standard video cassette, but the depth of said body being smaller than that of said video cassette;
   (b) a locking mechanism housed in said body, said locking mechanism comprising:
      (i) opposed locking members extending longitudinally of the body, said locking members each being movable between respective retracted positions in which said locking members are contained substantially wholly within the length, breadth and depth of said body and locking positions in which end portions of said locking members extend beyond the longitudinal ends of said body to frictionally engage the internal side walls of said opening and thereby retain said body in said opening and wherein at least one of said locking members having a stepped profile;
      (ii) means for resiliently biassing said locking members to said locking positions; and
      (iii) means for disengaging said biassing means such that said locking members are free to retract to said retracted positions; and
   (c) a peripheral flange comprising an end plate which extends beyond the periphery of said body and is arranged to completely cover said opening provided on said body for engaging said casing around the periphery of said opening, so as to prevent insertion of said body to a depth which would cause activation of said cassette-receiving mechanism.

8. A security device according to claim 7, wherein each of said end portions is provided with formations which are shaped so as to in use increase the grip thereof on associated complementary formations provided on the internal side walls of said opening when said body is urged outwardly away from said opening while said locking members are in said locked positions.

* * * * *